April 22, 1958 — J. T. REILLY — 2,831,367
FOOT OPERATED ACCELERATOR SETTING CONTROL
Filed Sept. 30, 1955
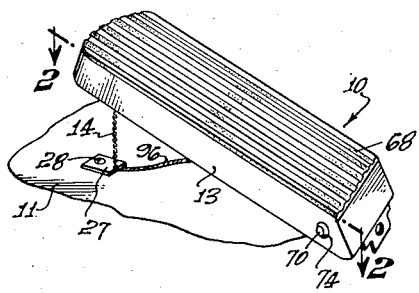
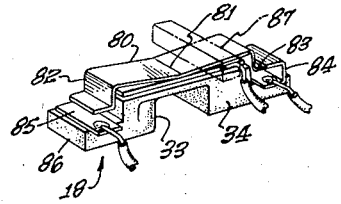
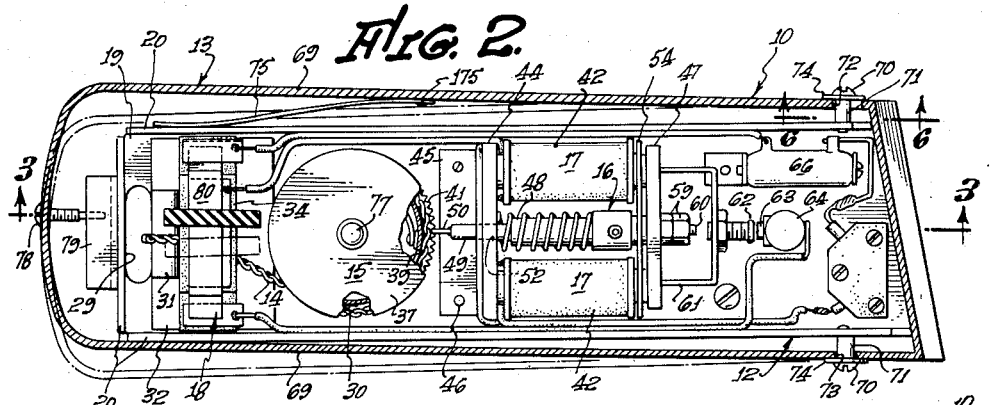
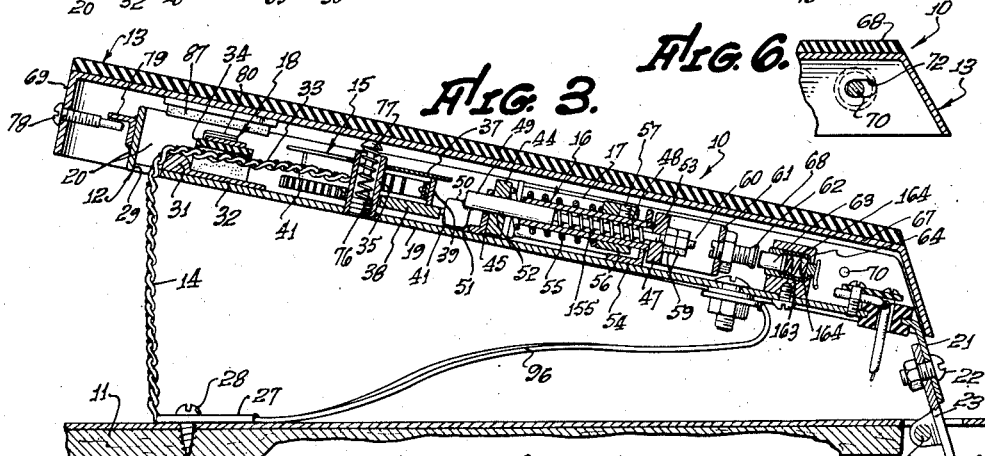
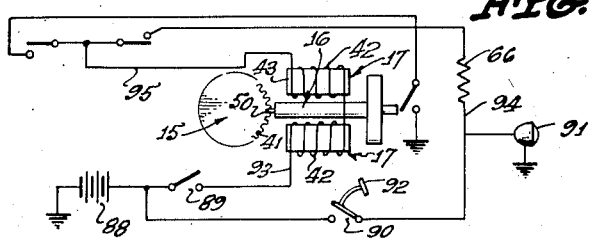
INVENTOR.
JAMES T. REILLY,
BY William P. Green
ATTORNEY.

United States Patent Office 2,831,367
Patented Apr. 22, 1958

2,831,367

FOOT OPERATED ACCELERATOR SETTING CONTROL

James T. Reilly, Laguna Beach, Calif.

Application September 30, 1955, Serial No. 537,681

16 Claims. (Cl. 74—513)

This invention relates to an improved speed controlling unit, particularly adapted for controlling the speed of a motor vehicle. In certain respects, the present device constitutes an improvement on the speed control apparatus disclosed and claimed in my Patent No. 2,670,822, issued March 2, 1954, on "Accelerator Setting Control."

In my above mentioned patent, I have disclosed an accelerator pedal unit which can be temporarily locked in any desired position within its range of movement, to maintain a desired vehicle speed even though the operator's foot may be removed from the pedal. The device is adapted to be set and released by movement of the operator's foot, and preferably constitutes a unit which can be easily installed in a vehicle as a replacement for the usual accelerator pedal.

A major object of the present invention is to provide for a somewhat different type of actuation in a device of the above character, which type of actuation is capable of being more easily controlled by an operator's foot. More particularly, a control embodying the invention includes a foot operated member which is mounted for both limited downward and limited lateral movement relative to the body of the pedal. The relative lateral movement serves to set the pedal holding mechanism at a particular speed, while the relative downward movement acts to release the holding mechanism when desired.

These two types of movement of the foot operated member may serve to control an electrically operated holding unit, preferably including an actuating solenoid or electromagnet. For thus controlling the solenoid, I may employ a pair of switches responsive to the two types of movement of the member, and controlling respectively a main energizing circuit and an auxiliary holding circuit. One of these switches may be operable, upon depression of the member in a first lateral position, to release the pedal, as by opening the holding circuit. The other switch may be actuable to close the main energizing circuit upon movement of the foot operated member laterally to a second position.

The foot operated member is desirably spring urged both upwardly and laterally relative to the pedal body to a predetermined normal position. To set the device at a particular speed, the foot operated member may be displaced laterally from the normal position to a setting position while the pedal is depressed, following which the operator removes his foot to allow the member to move upwardly and then laterally under the influence of suitable return springs. In this connection, a particular feature of the invention resides in the special formation of these springs to assure upward returning movement of the member prior to its lateral returning movement, in order to prevent unwanted releasing of the holding mechanism as the foot operated member returns to its normal position.

The above and other features and objects of the present invention will be better understood from the following detailed description of the typical embodiment illustrated in the accompanying drawing in which:

Fig. 1 is a perspective view of a motor vehicle accelerator pedal unit constructed in accordance with the invention;

Fig. 2 is an enlarged section through the pedal unit, taken in a plane parallel to the plane of the pedal;

Fig. 3 is a central vertical section through the pedal unit;

Fig. 4 is a fragmentary perspective view of the switch mechanism contained within the pedal;

Fig. 5 is a schematic representation of the electrical control circuit, and

Fig. 6 is an enlarged fragmentary section taken on line 6—6 of Fig. 2.

Referring first to Fig. 1, the drawing represents at 10 an accelerator pedal unit adapted to be mounted in a motor vehicle in substitution for the conventional accelerator pedal, and to control the speed of the vehicle by swinging movement of the pedal toward and away from the floorboard 11. Unit 10 includes a lower body section 12, and an upper relatively movable cover section 13, which form together a hollow housing structure within which the moving parts of the device are contained. For holding the unit 10 in any desired position within its range of movement, there is provided a flexible member 14 which is connected at its lower end to the floorboard and is windable at its upper end about a winding drum or reel 15 contained within the pedal unit. Reel 15 is adapted to be locked in any desired position, to maintain a corresponding vehicle speed, by means of a holding unit 16 actuated by a pair of electromagnets 17 under the control of a foot operated switch unit 18.

The lower body section 12 of unit 10 may be made of rigid sheet metal, forming a bottom wall 19 of the body, and forming upstanding side walls 20 extending about the periphery of body 12. At its rear end, the metal of body 12 may be turned angularly downwardly at 21, to form a flange which is attachable by a screw 22 to a swinging hinge element 23 by which the speed controlling movement of the pedal is transmitted to the engine. As will be apparent, hinge element 23 swings about a horizontal axis 24, and controls the engine through any suitable type of control mechanism typically and partially represented at 25 in Fig. 3. It will be obvious that this described manner of mounting body 12 is only one of various ways of mounting the body, and the latter may of course be adapted for mounting to the vehicle in any other conventional way. Whatever mechanism is provided for connection to the pedal, this mechanism will of course include at some point a spring for yieldingly urging pedal body 12 upwardly away from floorboard 11, this spring being diagrammatically represented at 26.

The flexible member 14 is preferably a chain, whose lower end may be attached to the floorboard by means of a small connecting element or plate 27 having an opening through which a screw 28 extends downwardly to connect into floorboard 11. Chain 14 extends upwardly through an opening 29 in the forward portion of bottom wall 19 of body 12, and then extends rearwardly within body 12 to connect at upper end 30 of the chain to reel 15. In extending rearwardly toward the reel, chain 14 first extends about the upper side of a curved essentially semicircular horizontally extending forward portion 31 of a rigid typically brass plate 32 to which switch mechanism 18 is mounted. Plate 32 is in some way suitably rigidly attached to the upper side of bottom wall 19 of body 12. Rearwardly beyond guide portion 31 of plate 32, chain 14 passes through a central opening 33 within an electrically insulative member 34 which carries the contacts of switch unit 18.

Reel 15 is mounted for rotation about an axis extending perpendicularly upwardly from bottom wall 19 of body 12, this mounting being effected by means of a tubular member 35 projecting upwardly from wall 19 and about which reel 15 is rotatably received. The reel includes two upper and lower circular discs or plates 37 and 38, which contain central alined openings for receiving mounting post 35, and which rigidly carry an outer cylindrical wall 39 extending axially between outer portions of plates 37 and 38. The end 30 of chain 14 is connected to this outer cylindrical wall 39, and the chain 14 is windable about that wall between the outer flange portions of the discs 37 and 38. A spirally coiled spring 40 contained within reel 14 is connected at its opposite ends to the inner non-rotatable mounting post 35 and the outer rotating reel wall 39, and yieldingly urges reel 15 in a rotary direction for winding chain 14 onto the reel (typically a counterclockwise direction as seen in Fig. 2).

The lower disc portion 38 of reel 15 has a series of rather closely spaced teeth 41 formed about its periphery, to be releasably engaged by holding unit 16 for retaining reel 15 in any desired rotary position, to thereby maintain the accelerator pedal unit 10 in a position for maintaining a corresponding vehicle speed. The two electromagnets 17 for actuating unit 16 consist of a pair of series connected parallel electromagnetic coils 42, wound about two parallel magnetic metal core elements 43 projecting from and rigidly carried by a magnetic metal cross piece 44 which is suitably stationarily attached to wall 19, as by means of an angular bracket member 45 secured to wall 19 by screws 46. Coils 42, when suitably energized, act to pull a relatively movable magnetic metal armature member 47 axially toward the coils (to the left as seen in Fig. 2), to move the associated holding unit 16 longitudinally into holding engagement with teeth 41 of reel 15.

The holding unit 16 includes a tubular member 48 rigidly carried by and projecting from member 47 between coils 42 and toward reel 15. This member 48 movably contains and guides for only longitudinal movement an elongated rod 49 which rigidly carries at its forward end a thin holding part 50 lying in a vertical plane and adapted to move forwardly into holding engagement with any of the various teeth 41 of reel 15. Member 50 may be stabilized and guided for its limited movement into and out of engagement with teeth 41, by sliding reception of the lower portion of element 50 within a guide slot 51 formed in the lower flange of member 45.

Near its forward end, rod 49 is guided for its desired longitudinal or axial movement by passage through an opening 52 in magnetic metal cross piece 44. Also, near the rear end of outer tube 48, this tube may be guided for axial movement by passage through an opening 53 within a non-magnetic rigid typically brass guide plate 54 extending between the ends of core elements 43. Parts 47, 48 and 49 are yieldingly urged as a unit to the right as seen in Fig. 2 by means of a coil spring 55 disposed about element 48 and bearing at one end against stationary member 44 and at the other end against a collar 56 rigidly secured to element 48 by means of a set screw 57. Such spring urged movement of these parts is limited by engagement of collar 56 with the forward side of cross piece 54, which is suitably secured in fixed relation to cores 43.

Rod 49 and its carried part 50 are free for very limited axial movement relative to and within tubular member 48, this movement being limited in one direction by engagement of element 50 with the end of slot 51, and this movement being limited in the other direction by engagement of member 47 with a forward one of two nuts 59 carried by a rear threaded portion 60 of rod 49. A coil spring 155 disposed about a reduced diameter portion of rod 49 yieldingly urges that rod to the left (as seen in Fig. 3) relative to element 48.

For automatically breaking the main energizing circuit through solenoids 42 when armature 47 is drawn toward those solenoids, the armature carries a yoke member 61 to which there is adjustably mounted a contact 62 which moves out of engagement with a second contact 63 upon the defined armature movement. Contact 63 may be mounted in an upstanding electrically insulative post 64 attached to bottom wall 19 of body 12, and may be yieldingly urged by a spring 164 through a very limited range of movement toward contact 62, to remain in engagement with contact 62 during a portion of the forward movement of contact 62 with armature 47. Thus, the energizing current to coils 42 is maintained through switch 62—63 as armature 47 is pulled toward the solenoids, with this main energizing current being cut off only during the final portion of the armature movement, at which time the movement of contact 63 is limited by engagement of the contact with a shoulder 163 in a tubular mounting element 164, so that contact 62 ultimately moves out of electrical engagement with contact 63. At that point, a reduced value holding current within coils 42 is effective to hold armature 47 and the associated parts in the reel locking position, even though the main energizing current is interrupted. The voltage and amperage of this holding current fed to solenoids 42 is reduced from the voltage and amperage of the main actuating current by means of a resistor 66 connected into the holding circuit. Spring 164 also serves a secondary function of exerting a yielding force tending to assist the coils 42 in initiating movement of armature 47 when the coils are energized.

The solenoid controlling actuation of switch unit 18 is effected by lateral and vertical movement of pedal cover 13 relative to the lower body section 12 of the pedal. Cover 13 has a top wall 67 carrying a sheet of tread material 68, typically formed of rubber. About its periphery, cover 13 has downwardly projecting side walls 69, which extend downwardly at the sides and ends of body 12. Cover 13 is of a somewhat larger transverse dimension than body 12 (see Fig. 2), to allow lateral movement of cover 13 relative to the body between the full line and broken line positions of Fig. 2.

The cover is mounted for its vertical and lateral movements by means of a pair of screws 70 which threadedly connect into and project laterally from side walls 20 of body 12 at opposite sides of body 12 and near its rear or lower end. These screws 70 are mutually alined and extend transversely of the pedal, with a short tube 71 being provided about each screw 70 between its head and the body wall into which the screw is connected. The elements 70 and 71 form together a pair of hinge pin units projecting laterally from the pedal body through openings 72 and 73 in the sides 69 of cover 13, to mount cover 13 for vertical swinging movement relative to body 13 about the horizontal axis of screws 70. A pair of washers 74 may be carried about tubes 71 outwardly beyond side walls 69 of cover 13, to effectively locate the cover relative to the body 12.

The opening 72 in the right side of cover 13 is somewhat elongated longitudinally of the pedal, to have a length in that direction which is greater than the diameter of the contained pin unit 70—71, so that at that location the cover is free for limited movement longitudinally of body 12. The opening 73 at the opposite side of the cover has a diameter corresponding essentially to the diameter of the pin unit 70—71, with only sufficient very slight looseness or play in the pin and opening connection at this point to allow for lateral swinging movement of cover 13 relative to body 12 in essentially the plane of the pedal about essentially the location of opening 73, and between the full line and broken line positions of Fig. 2. This slight lateral swinging movement is of course permitted by the longitudinal elongation of opening 72, to allow relative movement of cover and body at that location. The cover is yieldingly urged to the full line position of Fig. 2 by means of a leaf spring 75 which is attached at one end 175 to the inner side of cover 13, and whose opposite end yieldingly bears laterally against the side wall 20 of pedal body 12. The cover is yieldingly urged upwardly relative to body 12 by means of a coil spring 76 contained within tubular center post 35 which mounts the reel, there being a headed pin 77 urged upwardly by spring 76 against the top wall of the cover. The upward swing movement of cover 13 about hinge pins 70—71, and under the influence of spring 76, is limited by engagement of a removable screw 78 carried by the forward wall of cover 13, and projecting rearwardly to a location beneath an angular bracket element 79 carried by body 12. The downward relative movement of cover 13 is of course limited by engagement of the top wall of the cover with the side walls of body 12.

Switch unit 18 includes a resilient preferably copper contact 80 which extends transversely of the pedal, and whose central portion 81 is fastened in fixed relation to a conductor plate 82 attached to the upper side of electrically insulative mounting member 34. From the central mounting location 81, contact 80 extends angularly upwardly toward both sides of the pedal, and is yieldingly urged by its own resilience to the defined inclined position. Each end of this contact is displaceable downwardly relative to the central fixed portion 81 of the contact, to serve as a switch element. The right end of contact 80 is turned downwardly and then outwardly to form a contact portion 83 which is engageable with the underside of a contact element 84, to form a normally closed switch adapted to be opened by depression of the right end portion of contact 80. The left end of contact 80 extends downwardly and then outwardly to form a portion 85 which is engageable when depressed with contact 86, to form a normally open switch adapted to be closed by depression of the left end of contact 80.

The two ends of contact 80 are actuatable downwardly by depression of cover 13 relative to body 12 when the cover is in each of its two full line and broken line positions respectively of Fig. 2. This actuation of contact 80 is effected by means of a somewhat elongated electrically insulative member 87 which is fixed to the underside of top wall 67 of cover 13, and which extends longitudinally of the cover. When cover 13 is depressed relative to body 12, with the cover in its full line normal position of Fig. 2, such depression of the cover causes element 87 to move the right end portion of contact 80 downwardly, to thus break the switch 83—84 which controls the holding circuit to coils 42. When cover 13 is moved to the left by an operator's foot, while the foot holds cover 13 in its depressed position relative to body 12, such leftward movement causes element 87 to first release the right end of contact 80 for upward movement to close switch 83—84, following which further leftward movement actuates the left end of contact 82 downwardly to close the normally open switch 85—86. If the operator then withdraws his foot upwardly from the pedal unit, with cover 13 depressed and in its leftward broken line position of Fig. 2, spring 76 first moves cover 13 upwardly to open switch 85—86, following which spring 75 moves cover 13 to the right to its full line Fig. 2 position, but without opening the normally closed switch 83—84. Spring 76 is purposely made sufficiently strong relative to spring 75, to cause such upward movement of the cover prior to its lateral movement when an operator withdraws his foot upwardly with the cover in its depressed and leftward positions.

Fig. 5 shows the circuit diagram of the present device. In this circuit, I have represented at 88 the automobile battery, with the usual ignition switch being shown at 89, and with the stop light switch being shown at 90 for energizing stop light 91 when the brake pedal represented at 92, is depressed. There are two leads 93 and 94 which extend from pedal unit 10 (through an opening in the underside of body 12) for connection to the ignition switch 89 and stop light switch 90 at the locations represented in the diagram. The lead 93 from the ignition switch connects to coils 42 in series, which in turn are connected by a lead 95 to spring contact 80. Contact 84 is connected in series with resistor 66 to lead 94 leading to the stop light switch. Contact 86 is connected to spring pressed contact 63, with contact 62 being connected to the battery through ground. Preferably the ground connection is made very direct by electrically connecting the conductive metal body 12 by means of a grounding conductor strap 96 to element 27, which is in turn connected to the metal floorboard by screw 28.

In considering the operation of the device, assume first the condition in which cover 13 is in its right hand full line position of Fig. 2, and is also in its uppermost position relative to body 12. This is the position of cover 13 when the operator's foot is not resting on the cover. In this condition, switch 83—84 is closed, and completes an energizing circuit to coils 42, which circuit extends from battery 88, through switch 89, through coils 42, through switch 83—84, and then through resistor 66 and stop light 91 back to the battery. The current in this circuit is reduced to a rather small value by resistor 66 and stop light 91, and is sufficient to hold armature 47 in its actuated forward position of Fig. 2, but will not initially pull the armature to that position against the force of spring 55. Thus, when only this small holding current is passing through coil 42, armature 47 and the holding parts 49 and 50 for engaging the reel will remain in whatever position they happen to be in when this holding circuit was closed. If we assume that parts 47 to 50 are in the holding position illustrated in Fig. 2, then they will remain in that position until cover 13 is depressed relative to body 12 to open switch 83—84, and thus completely de-energize coils 42. Such depression results in rearward return of parts 47 to 50 out of holding engagement with teeth 41 of reel 15, to thus free the reel for rotation in a manner such that the reel and flexible member 14 do not hold the pedal against upward movement. The spring 26 for returning the pedal upwardly is of course stronger than spring 40 for rotating the reel, so that the former spring will act to urge the pedal unit upwardly except when the reel is held against rotation by element 50.

After an operator has depressed pedal cover 13 in its rightward full line position of Fig. 2, the operator may then actuate the pedal without restraint of any type. If he desires to set the pedal at a particular position, he merely moves his foot and cover 13 laterally to the left and to the broken line position of Fig. 2, so that element 87 allows end 83 of contact 80 to return upwardly into engagement with contact 84, and then displaces end 85 of contact 80 downwardly into circuit closing engagement with contact 86. Such closure of the normally open switch 85—86 closes a second energizing circuit to coils 42, through this switch 85—86 and switch 62—63. This energizing circuit places the coils 42 directly across the full voltage of battery 88, to cause a relatively large current to flow through coils 42, this current being sufficient to pull armature 47 forwardly to a position in which holding part 50 is received between two of the teeth 41 of reel 15, to lock the reel against rotation and thus hold pedal unit 10 in the desired set position. If element 51 initially engages a peak portion of one of the teeth 41, spring 96 allows limited movement of element 49 and its carried part 50 relative to element 48, until part 50 can move into a position between two of the teeth under the influence of spring 155 upon subsequent slight rotation of reel 13. As previously pointed out, spring pressed contact 63 remains in electrical engagement with solenoid actuated contact 62 during the initial movement of parts 47 to 50 and 62, to thus maintain the main energizing circuit to coils 42 closed until armature 47 is close enough to cores 54 of the coils to be held in the forwardly actuated position by the small holding current through switch 83—84. As will be apparent, the holding circuit is closed by the time main energizing switch 85—86 is closed upon leftward movement of cover 13, since such leftward movement acts to move the cover carried actuating element 87 off of the right end portion of contact 80, to allow that contact portion to resiliently return upwardly to its normal position for closing switch 83—84 which controls the holding circuit.

After cover 13 has thus been moved to the left, to close switches 85—86 and 83—84, so that holding part 50 is actuated into holding engagement with reel teeth 41, the operator then merely withdraws his foot upwardly off of the pedal unit to cause the pedal to remain in its set position. Upon such upward movement of the operator's foot, cover 13 is first returned upwardly relative to body 12 by spring 76 and to a position in which member 87 cannot actuate either end of the contact 80; and after such upward movement of the cover, the relatively weaker spring 75 acts to return cover 13 to the right to its normal full line position of Fig. 2. Since the cover is in its uppermost position relative to body 12 before the cover returns laterally to the right, the rightward movement of the cover and its carried member 87 does not open switch 83—84. As a result, the holding circuit through this switch remains closed, to hold the accelerator pedal unit in the desired set position until that circuit is subsequently broken by depression of cover 13 relative to body 12.

As a safety measure, the pedal unit is also adapted to be released from a set position by depression of brake pedal 92. As will be apparent from Fig. 5, such depression of the brake pedal acts through closure of stop light switch 90 to complete a short circuit about coils 42 and their various control switches, to thus completely deenergize these coils and allow movement of holding element 50 under the influence of spring 55 out of holding engegement with reel 15. A further safety feature results from the fact that, if the circuit to the coils is in any way accidentally broken, spring 55 will immediately urge the reel holding parts to their released positions, to avoid any interference with normal operation of the vehicle.

I claim:

1. Speed control mechanism comprising an accelerator pedal body to be mounted in a motor vehicle for generally upward and downward speed controlling movement, a member movably connected to said pedal body and actuable relative thereto by an operator's foot, means attaching said member to said pedal body for limited relative lateral movement between first and second positions and also for limited downward movement relative to said body, holding means for releasably holding said pedal body in any of different positions within its range of upward and downward movement to thereby maintain the vehicle speed at a desired value, means operable to release said holding means in response to depression of said member relative to said pedal body when the former is in said first relative lateral position, said last mentioned means including a switch controlling said release of the holding means and actuable to a releasing position by said depression of said member relative to the pedal body, a second switch responsive to lateral movement of said member, when depressed, to said second position to actuate said holding means to active holding condition, said second switch being then actuable between its closed and open conditions by upward movement of said member in second position.

2. Speed control mechanism as recited in claim 1, including a first spring yieldingly urging said member laterally relative to said body to said first position, and a second spring yieldingly urging said member upwardly relative to said body, said second spring being strong enough to displace said member relatively upwardly prior to its lateral return by the first spring to said first position when an operator lifts his foot off the pedal in said second position.

3. Speed control mechanism comprising a hollow accelerator pedal unit adapted to be mounted in a motor vehicle for speed controlling movement toward and away from a floorboard, said unit including a pedal body and a cover extending across the upper side thereof on which an operator's foot may rest, a flexible member to be fastened against bodily upward movement relative to the floorboard and extending upwardly into siad hollow pedal unit, a reel in said hollow pedal unit for winding said flexible member, releasable electrically operated holding means in said pedal unit for holding the reel against unwinding rotation to thereby hold the pedal body in any of different positions within its range for movement, means mounting said cover to said body for limited relative lateral movement between first and second positions and also for limited relative vertical movement, first control means operable to release said electrically operated holding means in response to depression of said cover relative to said body in said first position, and second control means operable to actuate said electrically operated holding means to active holding condition, and to then maintain said holding means in said holding condition, in response to foot induced movement of said member first laterally relative to the pedal body from said first position to said second position, while the member is depressed relative to the pedal body, and then upwardly relative to the pedal body while in said second position.

4. Speed control mechanism as recited in claim 3, including a first spring urging said cover laterally relative to the pedal body to said first position, and a second spring urging said cover relatively upwardly.

5. Speed control mechanism as recited in claim 4, in which said first control means include a first switch responsive to depression of said cover relative to the body in said first position, said second control means including a second switch actuable by lateral movement of said cover from said position to said second position and actuable by upward movement of the cover when in said second position.

6. Speed control mechanism as recited in claim 4, in which said electrically operated means include a solenoid and a holding part actuated thereby, said second control means including a switch operable to close an actuating circuit to said solenoid upon relative lateral movement of the cover from said first position to said second position, said first control means including an additional switch operable to open a holding circuit for said solenoid upon depression of the cover relative to said body in said first position.

7. Speed control mechanism as recited in claim 6, in which said first switch is actuable away from solenoid energizing position by upward movement of the cover in said second position, said second spring being strong enough to displace the cover upwardly relative to the body before the first spring returns the cover laterally to said first position when an operator lifts his foot from the pedal in said second position.

8. Speed control mechanism comprising an accelerator pedal body to be mounted in a motor vehicle for generally upward and downward speed controlling movement, a member movably connected to said pedal body and actuable relative thereto by an operator's foot, means attaching said member to said pedal body for limited relative lateral movement between first and second positions and also for limited upward and downward movement relative to said body, holding means for releasably holding said pedal body in any of different positions within its range of upward and downward movement to thereby maintain the vehicle speed at a desired value, means operable to release said holding means in response to depression of said member relative to said pedal body when the former is in said first relative lateral position, and means operable to actuate said holding means to its active holding condition, and to then maintain said holding means in said holding condition, in response to foot induced movement of said member first laterally relative to the pedal body from said first position to said second position, while the member is depressed relative to the pedal body, and then upwardly relative to the pedal body while in said second position.

9. Speed control mechanism as recited in claim 8, in which said first mentioned means comprise hinge means mounting said member to said pedal body for limited relative swinging movement both downwardly and laterally about a location near the lower end of the pedal body.

10. Speed control mechanism as recited in claim 8, in which said pedal body is hollow, and said members comprises a foot actuated cover extending across the upper side of the pedal body, said first mentioned means comprising two hinge pin connections at opposite sides of a lower end of the body and cover mounting the latter for limited relative downward swinging movement, one of said hinge pin connections comprising a pin received within and free for limited movement along a slot to allow for lateral swinging movement of the cover relative to the pedal body.

11. Speed control mechanism as recited in claim 8, in which said means for releasing said holding means include an electric switch for controlling said release and actuable by depression of said member relative to the pedal body in said first relative lateral position.

12. Speed control mechanism as recited in claim 8, in which said last mentioned means include an electric switch controlling actuation of said holding means to holding condition and operable by foot controlled lateral movement of said member from said first position to said second position relative to the pedal body.

13. Speed control mechanism as recited in claim 8, including a spring yieldingly urging said member laterally relative to said pedal body to said first position.

14. Speed control mechanism as recited in claim 13, including a second spring yieldingly urging said member upwardly relative to said pedal body.

15. Speed control mechanism as recited in claim 14, in which said second spring is sufficiently strong relative to said first spring to return said member upwardly before the second spring moves it laterally to said first position when an operator removes his foot upwardly from the pedal with said member depressed relative to the pedal body and in said second position.

16. Speed control mechanism as recited in claim 15, in which said last mentioned means of claim 8 includes a contact structure extending laterally of said pedal body and having two resilient contact carrying arms inclined upwardly and laterally outwardly in opposite directions from a central portion of said structure, means carried by said member and operable to actuate one of said arms downwardly in response to downward movement of said member relative to said pedal body in said first position, said means carried by said member being then operable to release said one arm for upward movement and to cam the second arm downwardly in response to movement of said member laterally between said first and second positions, and to then release the second arm for upward movement upon upward movement of the member in said second position, and there being switch contact means engageable by said two arms to release said holding means by relative depression of said member in said first position, and to actuate said holding means to active condition upon lateral movement of the member to said second position and then upward movement in said second position.

References Cited in the file of this patent
UNITED STATES PATENTS

| | | |
|---|---|---|
| 543,855 | Denison | Aug. 6, 1895 |
| 1,883,437 | Adams | Oct. 18, 1932 |
| 2,071,695 | Hyde | Feb. 23, 1937 |
| 2,270,002 | Glick | Jan. 13, 1942 |
| 2,533,836 | Patterson | Dec. 12, 1950 |
| 2,554,619 | Goik | May 29, 1951 |
| 2,670,822 | Reilly | Mar. 2, 1954 |